(12) United States Patent
Kusafuka et al.

(10) Patent No.: US 6,250,767 B1
(45) Date of Patent: Jun. 26, 2001

(54) LIGHT GUIDE PLATE, SURFACE LIGHT SOURCE AND DISPLAY USING THE SAME

(75) Inventors: Takanari Kusafuka, Yoro-gun; Masahiro Higuchi, Anpachi-gun; Kenkiti Okamoto, Kagamigahara; Michiaki Sato, Ichinomiya; Yoshiaki Yamada; Kenji Kiyota, both of Ogaki, all of (JP)

(73) Assignee: Sanyo Electric Co. Ltd., Osaka (JP)

( * ) Notice: Subject to any disclaimer, the term of this patent is extended or adjusted under 35 U.S.C. 154(b) by 0 days.

(21) Appl. No.: 09/334,065

(22) Filed: Jun. 16, 1999

(30) Foreign Application Priority Data

Jun. 22, 1998 (JP) .................................................. 10-174498

(51) Int. Cl.$^7$ ....................................................... F21V 8/00
(52) U.S. Cl. .............................. 362/31; 362/84; 362/800; 362/23
(58) Field of Search ................................. 362/31, 318, 23, 362/26, 800, 84

(56) References Cited

U.S. PATENT DOCUMENTS

| | | | |
|---|---|---|---|
| 4,043,636 | * 8/1977 | Eberhardt et al. | 349/345 |
| 4,573,766 | * 3/1986 | Bournay, Jr. et al. | 362/31 |
| 5,027,258 | * 6/1991 | Schoniger et al. | 362/31 |
| 5,608,837 | * 3/1997 | Tai et al. | 362/31 |
| 5,673,999 | * 10/1997 | Koenck | 362/263 |
| 6,036,327 | * 2/2000 | Blonder et al. | 362/31 |

* cited by examiner

Primary Examiner—Thomas M. Sember
(74) Attorney, Agent, or Firm—Arent Fox Kintner Plotkin Kahn, PLLC (57) ABSTRACT

The present invention provides a light guide plate and a surface light source using the light guide plate to improve the utilization efficiency of external light and light from an internal light source and to achieve thinner width of the light guide plate. In this invention, internal light emitted from an internal light source 3 is brought to the inside of the light guide plate 1 from an internal light collecting surface 16 in the light guide plate 1, and external light such as natural light is brought to the inside of the light guide plate 1 from an external light collecting portion 11. The light brought to the inside of the light guide plate reflects and is converged several times from a reflective plate 15 mounted to the outside of the light reflective surface 14 and three side end surfaces 12 and is emitted from the light emissive surface 13 of the light guide plate 1 to a diffusing plate 6. The light incident to the diffusing plate 6 is diffused uniformly within the desired angle range by the diffusing plate 6 and a lens sheet 7, and is emitted from the lens sheet 7 as synthesized light.

17 Claims, 6 Drawing Sheets

LIGHT GUIDE PLATE, SURFACE LIGHT SOURCE AND DISPLAY USING THE SAME

BACKGROUND OF THE INVENTION

1. Field of the Invention

The present invention relates to a light guide plate, a surface light source and a display using the light guide plate, and more particularly, relates to a light guide plate which collects light from an internal light source and external light from the sun or a fluorescent lamp and emits a simple light or a synthesized light from a light emissive surface thereof, a surface light source serving as a back light for a non-self light emission type display, which does not emit light by itself, such as a liquid crystal display, and a back light type display such as a liquid crystal display for a digital still camera or a video camera which displays an object.

2. Description of the Prior Art

Examples of a surface light source for a back light of a liquid crystal display (LCD) include one of a side light type having a transparent flat plate as a light guide plate. In such a surface light source, light from such light sources as a fluorescent lamp is incident from one of side end surfaces of a light guide plate comprising a transparent parallel flat plate or a flat plate having a wedge shape in cross section, the light is propagated throughout the whole area of the light guide plate by utilizing total reflection inside the transparent flat plate, a part of the propagated light is changed into diffused reflected light at less than a critical angle by a light scattering reflective plate on the reverse surface of the light guide plate, and the diffused light is emitted from the surface of the light guide plate (see Japanese Utility Model Laid-Open No. 16220 1/1980).

Furthermore, examples of a surface light source for a back light include one that has an external light collecting portion at side end surfaces of the light guide plate in order to use external light such as the sunlight and light from a lighting apparatus as a secondary light source. The external light collecting portion, having a semicircle shape in cross section, forms a cylindrical lens (see Japanese Patent Laid-Open No. 11249/1993).

Figure 6:
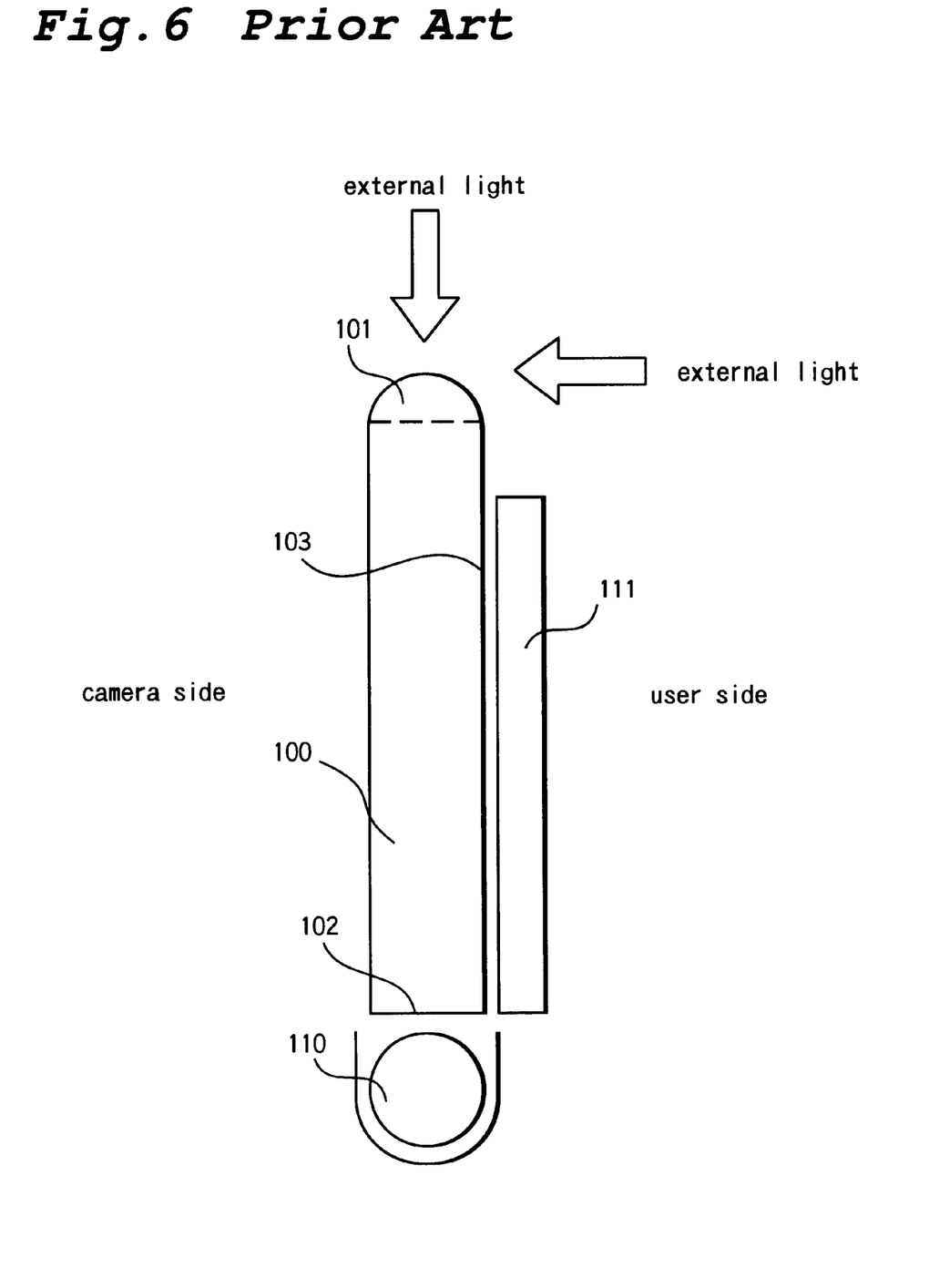
FIG. 6 is a schematic view illustrating a conventional liquid crystal display.

FIG. 6 is a schematic view illustrating a conventional liquid crystal display.

The conventional liquid crystal display comprises a liquid crystal panel 111, an internal light source 110 such as a fluorescent tube, and a light guide plate 100. When using this liquid crystal display as a liquid crystal monitor for an electric still camera, for example, a body of a camera is positioned on the left hand of the light guide plate 100 in the figure, and a user watches images from the right hand of the liquid crystal panel 111 in the figure through the light emitted from the light emissive surface 103.

An external light collecting portion 101 comprising a cylindrical lens having a semicircle shape in cross-section is provided at an upper end of the light guide plate 100 included in the conventional liquid crystal display in order to collect external light as main light. Therefore, external light from the upper and side direction can be collected effectively.

An internal light source 110 is provided in the lower proximity to an internal light collecting surface 102 which is opposite to the external light collecting portion 101. The internal light source 110 emits secondary light to the internal light collecting surface 102 when external light is not sufficient due to cloudy or rainy weather or indoor use. The light incident from the internal light collecting surface 102 reflects several times in the inside of the light guide plate 100 and most of the incident light is emitted from the light emissive surface 103 in the end.

The conventional liquid crystal display, however, has a construction in which the external light collecting portion 101 and the internal light source 110 face each other. In conjunction with this, light reflection process can not be applied to the external light collecting portion 101 and the internal light collecting surface 102 since light comes in from the external and internal light source. As a result, a part of the external light collected from the external light collecting portion 101 leaks from the internal light collecting surface 102 and a part of the light incident from the internal light source through the internal light collecting surface 102 e dispersed from the external light collecting portion 101, causing extreme decrease the efficiency of utilizing the external light and the light from the internal light source.

The thickness of the light guide plate comprising the light guide plate 100 and the internal light source 110 of the conventional liquid crystal display in FIG. 6 is considerably restricted to the thickness of the internal light source 110 as taking the collecting efficiency of internal light and limitation in size of the internal light source 110 in mechanical view point into consideration. It causes a difficulty in making a light guide plate slimmer.

SUMMARY OF THE INVENTION

To overcome the above described drawback, the present invention has an objective to provide a light guide plate and a surface light source using the light guide plate to improve the utilization efficiency of external light and light from an internal light source and to achieve a slimmer light guide plate.

A light guide plate according to the present invention comprises a light guide plate having a light incident surface and light emissive surface, an external light collecting portion formed on one end of the light guide plate for collecting external light, and an mounting portion for an internal light source formed for mounting an internal light source in proximity to the external light collecting portion in the light guide plate.

The light guide plate of the present invention includes an internal light collecting surface formed on the mounting portion for an internal light source.

The mounting portion for an internal light source may be formed in a position where external light incident from the external light collecting portion in the light guide plate is not obstructed thereby.

The mounting portion for an internal light source can be formed on the light emissive surface in the light guide plate.

The mounting portion for an internal light source is formed on an opposite surface to the light emissive surface in the light guide plate and on the external light collecting portion side from an extended line along the most upper surface on which a non-self light emission type display is mounted.

In the above mentioned construction, a light reflection process can be employed to the opposite surface to the external light collecting portion. Therefore, the present invention can contribute to reducing electric power consumption by preventing the light collected from the external and internal light collecting portion from being leaked and improving the efficiency of light utilization.

A surface light source of the present invention comprises a light guide plate having a light incident surface and light emissive surface, an external light collecting portion formed on one end of the light guide plate for collecting external light, an mounting portion for an internal light source formed in proximity to the external light collecting portion in the light guide plate, and an internal light source provided to the mounting portion for an internal light source.

The internal light source is formed in a position where external light incident from the external light collecting portion in the light guide plate is not obstructed thereby.

In the above mentioned construction, the internal light source is disposed in proximity to the external light collecting portion and a light reflection process can be employed to the opposite surface to the external light collecting portion. Therefore, the present invention can contribute to reducing electric power consumption by preventing the light collected from the external and internal light collecting portion from being leaked and by improving the efficiency of light utilization.

The internal light source can be disposed on the light emissive surface in the light guide plate.

The internal light source is disposed on an opposite surface to the light emissive surface of the light guide plate and on the external light collecting portion side from an extended line along the most upper surface on which a non-self light emission type display is mounted.

In the above mentioned construction, the internal light source is disposed on the light emission side of the light guide plate or on the external light collecting portion side from an extension of the surface on which the non-self light emission type display is mounted. This construction can achieve a slimmer device.

The internal light source can be a light emitting diode.

The light emitting diode as an internal light source emits white light.

The light guide plate is provided with wavelength converting means for converting wavelength of light emitted from the light emitting diode as an internal light source.

The wavelength converting means is fluorescent material put into the inside of the light guide plate.

The wavelength converting means is fluorescent material layer provided on the light emissive surface or the opposite surface to the light guide plate.

In the above construction, a surface light source of the present invention can be slimmer than that using a fluorescent tube.

Light reflection means can be provided to a opposite surface to the external light collecting portion in the light guide plate. The light reflection means can contribute to improving a reflection efficiency of light, in other words, a efficiency of light utilization.

A display of the present invention comprises a light guide plate having a light incident surface and light emissive surface, an external light collecting portion formed on one end of the light guide plate for collecting external light, a mounting portion for an internal light source formed in proximity to the external light collecting portion in the light guide plate, an internal light source provided to the mounting portion for an internal light source, and a non-self light emission type display mounted in proximity to the light emissive surface of the light guide plate.

The non-self light emission type display can be a liquid crystal panel.

A display of the above construction can contribute to reducing consumption of electricity.

The foregoing and other objects, features, aspects and advantages of the present invention will become more apparent from the following detailed description of the present invention when collected conjunction with the accompanying drawings.

PREFERRED EMBODIMENT OF THE PRESENT INVENTION

First of all, the term definitions will be made.

A light incident surface refers to a surface which is formed on a light guide plate. That is an internal light collecting portion for collecting light from an internal light source such as a conventional fluorescent lamp, an light emitting diode (hereinafter referred as LED) in this embodiment and so on, and a surface for collecting external light such as the sunlight and light from lighting apparatus (an external light collecting portion).

A non-self light emission type display is a display which does not emit light by itself, for example a liquid crystal panel which requires a light source such as a back light.

The following embodiments of the present invention will be described in detail with reference to the drawings.

Figure 1:
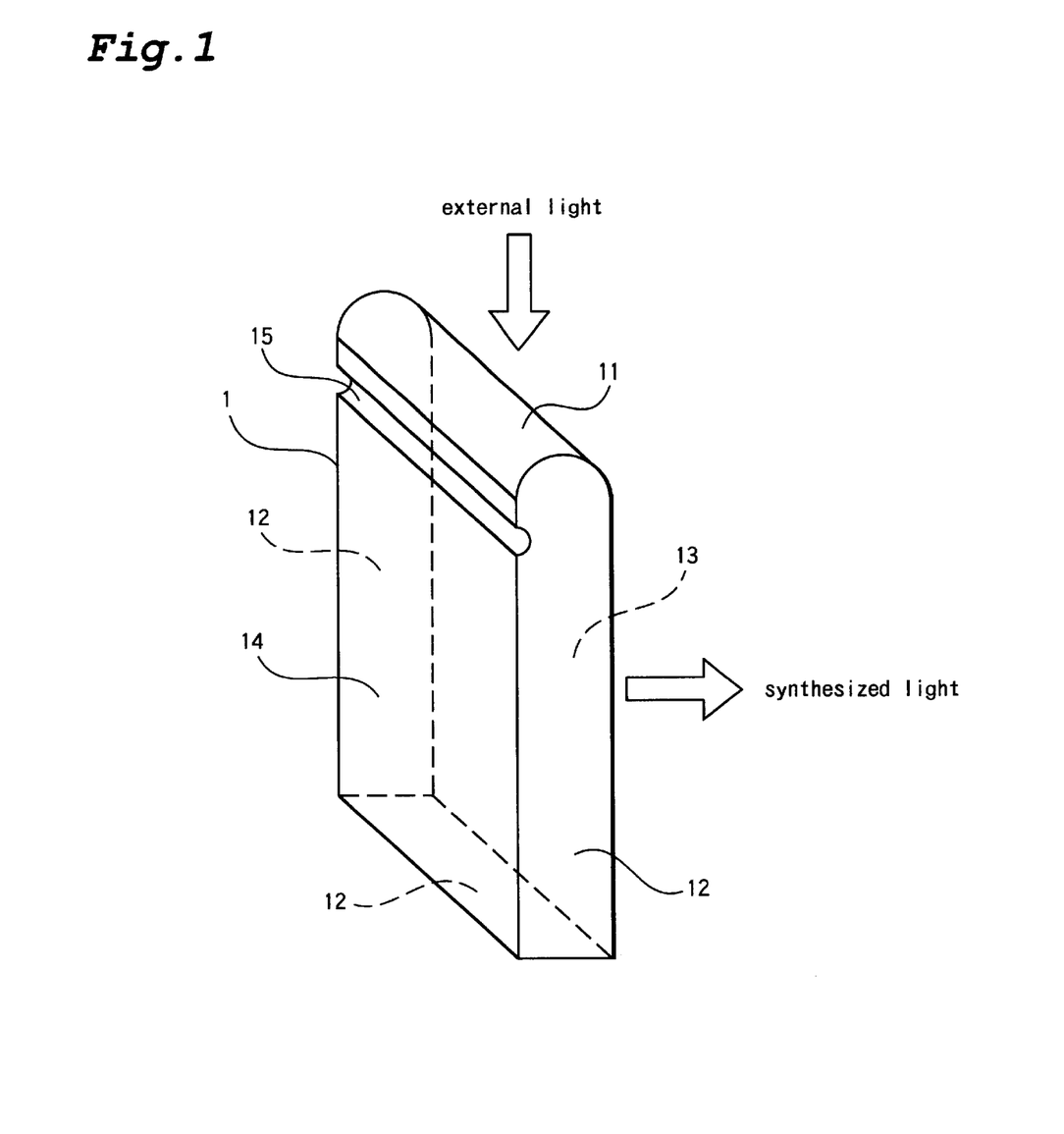
FIG. 1 is a perspective view illustrating a light guide plate of the present invention.

FIG. 1 is a perspective view illustrating a light guide plate of the present invention.

As for a light guide plate 1, when a body of the light guide plate 1 is formed by resin forming with a mold, an external light collecting portion 11, which will be described in detail later, is also formed on the upper end of the light guide plate 1 at the same time.

The external light collecting portion 11 collects external light such as the sunlight and light from lighting apparatus as main light. Generally the external light collecting portion 11 is a transparent cylindrical lens having a semicircle shape in cross section. The surface of the external light collecting portion, however, is applied dull finish to make the surface opaque or is filled with light scattering materials so as to make the inside of the device invisible. In general, the whole surface area of a mold for the external light collecting portion part is blasted to make the surface dull. By using this mold for resin forming, the surface of the external light collecting portion 11 is made dull. Other than the above described methods, surface corrosion by etching or direct blasting are also available to make the dull surface of the external light collecting portion 11 which is finished transparent.

A mounting portion for an internal light source 15 is provided with the light guide plate 1. As described later, an internal light source such as an LED, micro lamp, fluorescent tube or the like is mounted on the mounting portion for an internal light source 15, and light from the internal light source is incident therefrom.

A light reflective surface 14 is provided in the light guide plate 1. After resin forming, dot pattern printing is carried out or corn-shaped asperity is formed on the light reflective surface 14, then a reflective plate made from Aluminum or a film (not shown) is attached in order to prevent light leakage and increase the reflection efficiency.

A light emissive surface 13 is formed on opposite side of the light reflective surface 14 in the light guide plate 1. Light incident from the external light collecting portion 11 and light from the internal light source mounted on the mounting portion for an internal light source 15 reflect from the light reflective surface 14 and three side end surfaces 12 of the light guide plate 1. Most of the incident light is emitted from the light emissive surface 13 as a synthesized light having the even directivity in the end. Leakage prevention materials, such as white tape, is affixed to the side end surfaces 12 in order to prevent light leakage.

A material for the light guide plate 1 is selected from transparent materials. Generally, acrylic resin or polycarbonate resin is used. The shape of the light guide plate is a parallel and flat plate or flat plate having a wedge shape in cross section. The thickness of the light guide plate is approximately 1 to 10 mm in general. In the present invention, the light guide plate can be made slimmer by using an LED or micro lamp than using a fluorescent tube.

Examples of the other transparent materials include acrylic ester such as polymethyl methacrylate and polyacrylic acid methyl, methacrylate ester alone or its copolymers, polyester such as polyethylene terephthalate and polybutylene terephthalate, thermoplastic resin such as polycarbonate, polystyrene, and polymethylpentene, acrylate such as multifunctional urethane acrylate and polyester acrylate cross-linked by ultraviolet rays or electron beams, transparent resin such as unsaturated polyester, transparent glass, and transparent ceramics.

The function of the light guide plate of the present invention will be described using FIG. 1.

External light such as the outside sunlight and a fluorescent lamp or the like in a room is incident to an external light collecting portion 11 in a light guide plate 1 efficiently. As a result, sufficient lighting can make it unnecessary to turn on an internal light source mounted on a mounting portion for an internal light source 15, and the reduction of power consumption can be achieved. When an internal light source is turned on, internal light incident from the internal light source and external light collected from the external light collecting portion 11 reflects from the light reflective surface 14 and the three side end surfaces 12 of the light guide plate 1, and is emitted from the light emissive surface 13 as a synthesized light having the even directivity.

Although an internal light source of a conventional light guide plate is visible, that of the present invention becomes invisible by making an external light collecting surface of the external light collecting portion 11 dull. As a result, the problem that a user has inharmonic feeling from the design point of view can be overcome.

Figure 2:
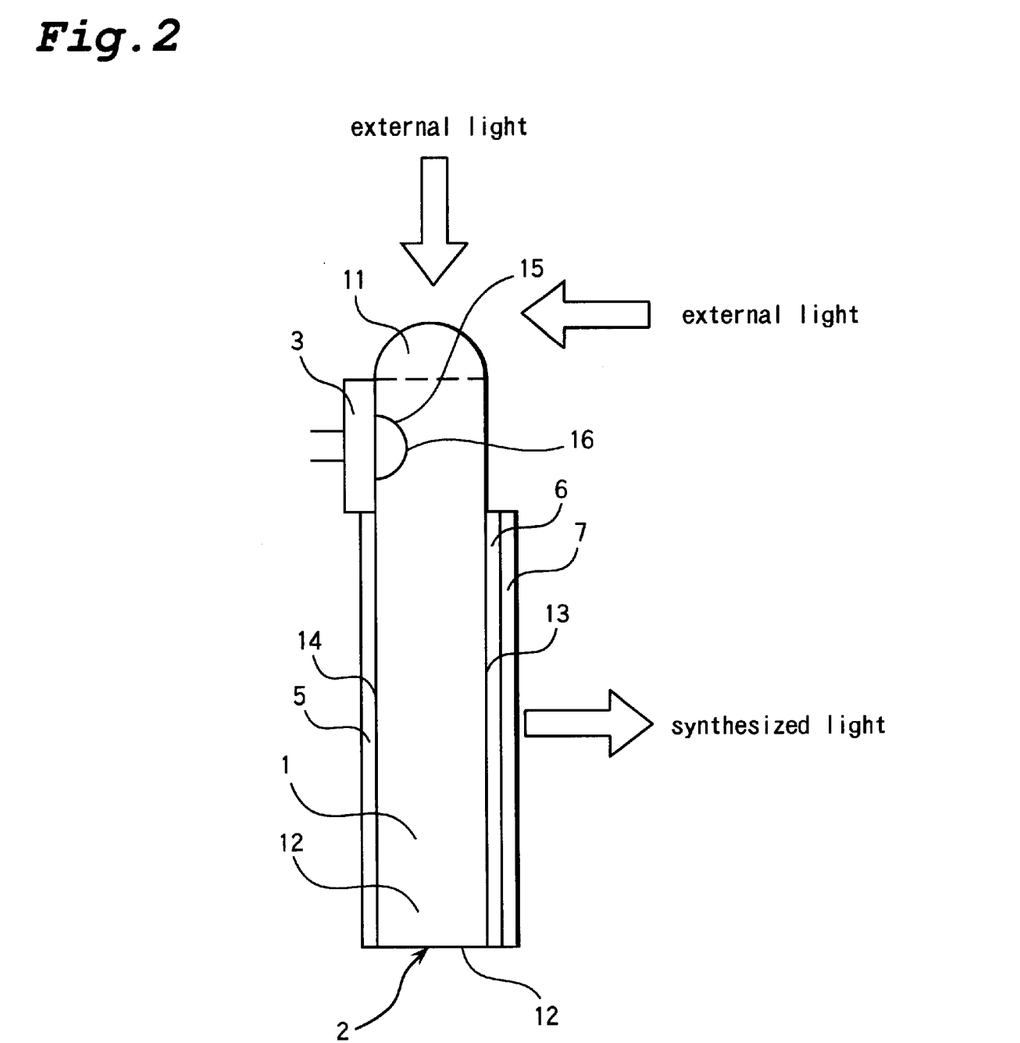
FIG. 2 is a schematic view illustrating a surface light source of the present invention.

FIG. 2 is a schematic view illustrating a surface light source of the present invention.

A surface light source 2 comprises the light guide plate 1, the internal light source 3 such as an LED and a fluorescent tube etc., and any kind of control circuits (not shown), and so on. For example, the control circuits include a circuit which detects the total amount of light emitted from the light emissive surface in the light guide plate 1, adjusts the electric power to optimize the amount of light emission, and supplies the electric power to the internal light source 3.

The internal light source 3 is fixed to the mounting portion for an internal light source 15 in the light guide plate 1 of the present invention with a screw or transparent adhesive. However, it may also be possible to form the light guide plate 1 and the surface light source in one piece at one time by filling resin after attaching the internal light source 3 (for example, a light source in which LED pellet is superimposed on a lead frame and is bonded) to a mold of the light guide plate at the time of a light guide plate forming. To make the light guide plate slimmer, the internal light source 3 is disposed on the external light collecting portion side from an extension of the surface on which a non-self light emission type display is mounted. A reflective plate 5 made from aluminum etc. is provided on an outer surface of the light reflective surface 14 in the light guide plate 1 in order to increase the reflection efficiency. A diffusing plate 6 is provided on the light emission side of the light emissive surface 13 in the light guide plate 1, and a lens sheet 7 is provided on the light emission side of the diffusing plate 6.

Internal light (not shown) emitted from the internal light source 3 is brought to the inside of the light guide plate 1 from the internal light collecting surface 16 mounted to the mounting portion for an internal light source 15 in the light guide plate 1. Outer light such as natural light is brought to the inside of the light guide plate 1 from the external light collecting portion 11 in the light guide plate 1. The light brought to the inside of the light guide plate 1 is reflected and converged several times from the reflective plate 5 mounted on the outer side of the light reflective surface 14 and three side end surfaces 12 and is emitted from the light emissive surface 13 in the light guide plate 1 toward the defusing plate 6. The light incident in the defusing plate 6 is diffused uniformly within the desired angle range by the defusing plate 6 and a lens sheet 7 and is emitted as a synthesized light from the lens sheet 7. When the internal light source 3 is a single color LED (e.g. blue), the light guide plate 1 has wavelength converting means for converting the emitted light into white light. The wavelength converting means can be, for example, fluorescent material contained in the light guide plate 1 or fluorescent layer provided on the light emissive surface 13 and the light incident surface 14 of the light guide plate 1. YAG (yttrium aluminum garnet) based fluorescent material can be employed as the fluorescent material when a GaN based blue LED is used. For example, phosphor for white chip type LED such as "NSCW100" marketed by Nichia Chemical Industries Ltd., can be used. Wavelength converting means is not necessary for the light guide plate 1 when the white chip type LED is used. A one-packaged LED containing three colors, red, green, and blue can also be used as an LED which emits white light. One of examples for a one-packaged LED of three colors is "NSTM515S" marketed by Nichia Chemical Industries Ltd.

Figure 3:
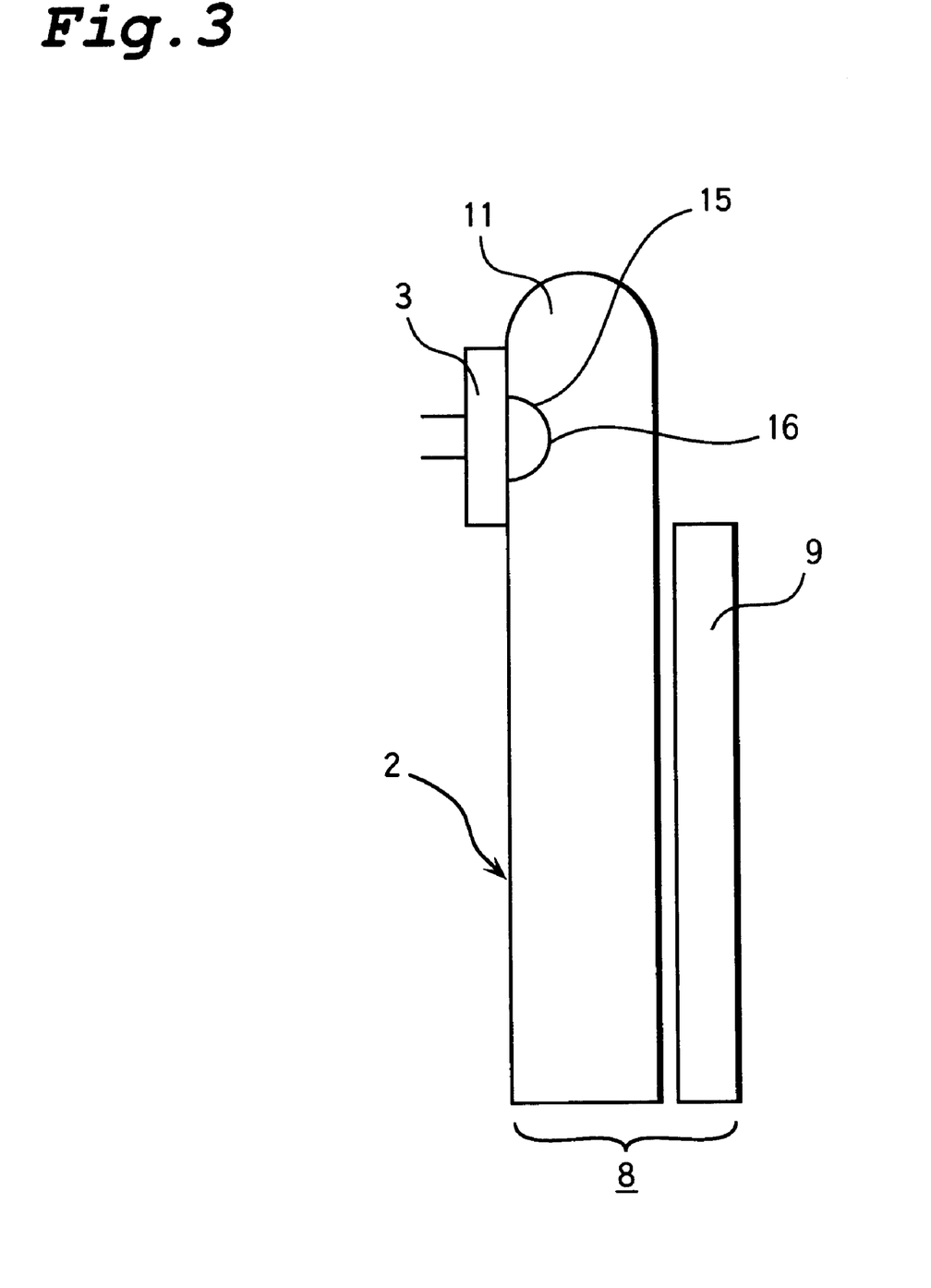
FIG. 3 is a schematic view illustrating a display provided with a surface light source of the present invention.

FIG. 3 is a schematic view illustrating a display provided with a surface light source of the present invention.

Figure 5:
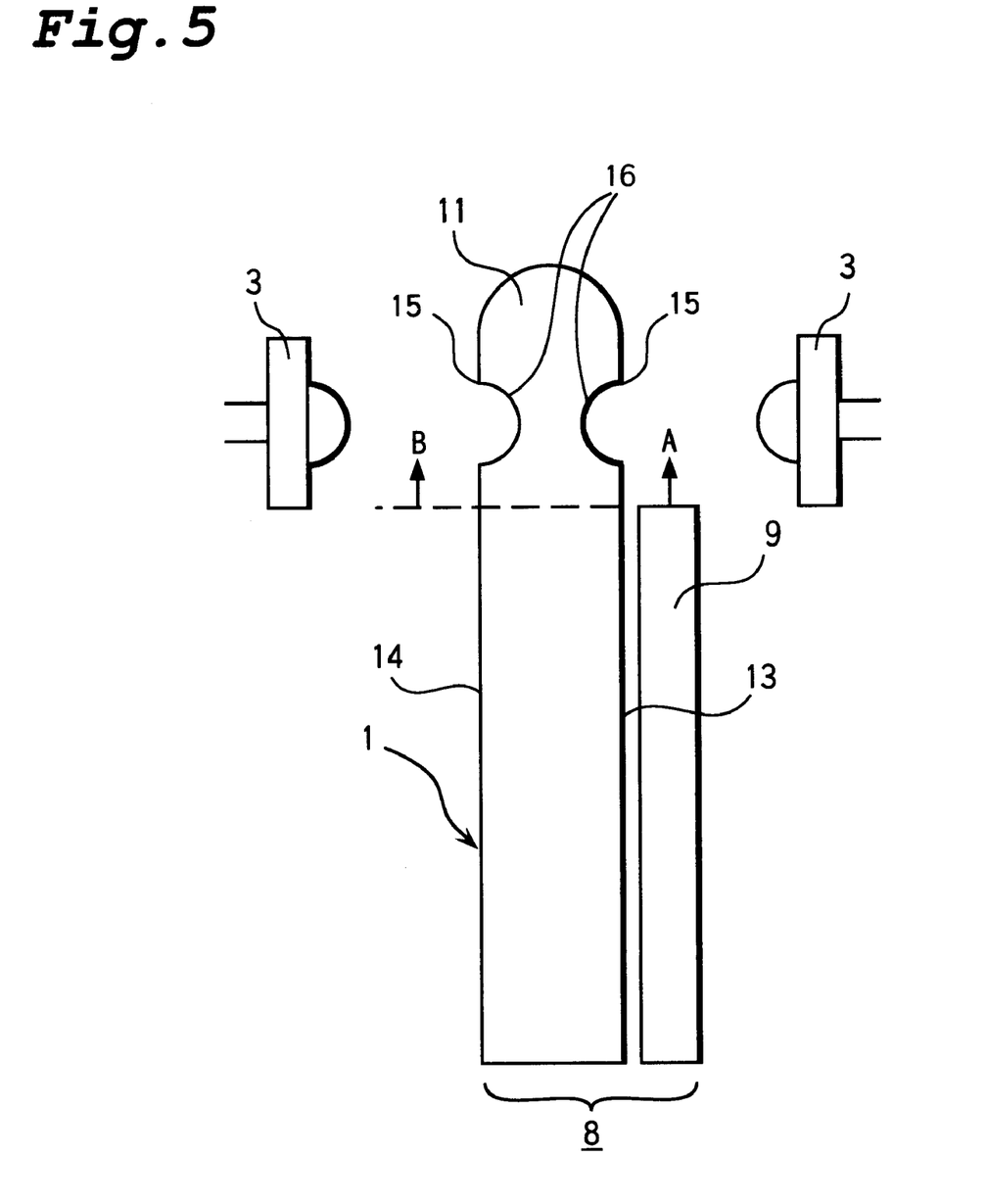
FIG. 5 is a schematic view illustrating a position where an internal light source is mounted in the light guide plate of the present invention.

A display 8 of the present invention comprises a liquid crystal panel 9 as a non-self light emission type display and a surface light source 2 of the present invention. The light uniformly diffused and emitted from the surface light source 2 is brought to the liquid crystal panel 9. The internal light source 3 in this embodiment is disposed on the side of the external light collecting portion 11 and the reflective surface 14 in the light guide plate 1 from an extension of the surface on which the liquid crystal panel 9 is mounted. In other words, as shown in FIG. 5, a mounting portion for an internal light source 15 is positioned on a surface side indicated by an arrow B from an extended line (a broken line in the figure) along the most upper surface on which the liquid crystal panel 9 is mounted. The internal light source 3 is mounted on the mounting portion for an internal light source 15.

The internal light source 3 can be disposed on the side of the external light collecting portion 11 and the light emissive surface 13 in the light guide plate 1 from an extension of the surface on which the liquid crystal panel 9 is mounted. In other words, as shown in FIG. 5, a mounting portion for an internal light source 15 can be positioned on a surface side indicated by an arrow A from an extended line (a broken line in the figure) along the most upper surface on which the liquid crystal panel 9 is mounted. The internal light source 3 can be mounted on the mounting portion for an internal light source 15.

Figure 4:
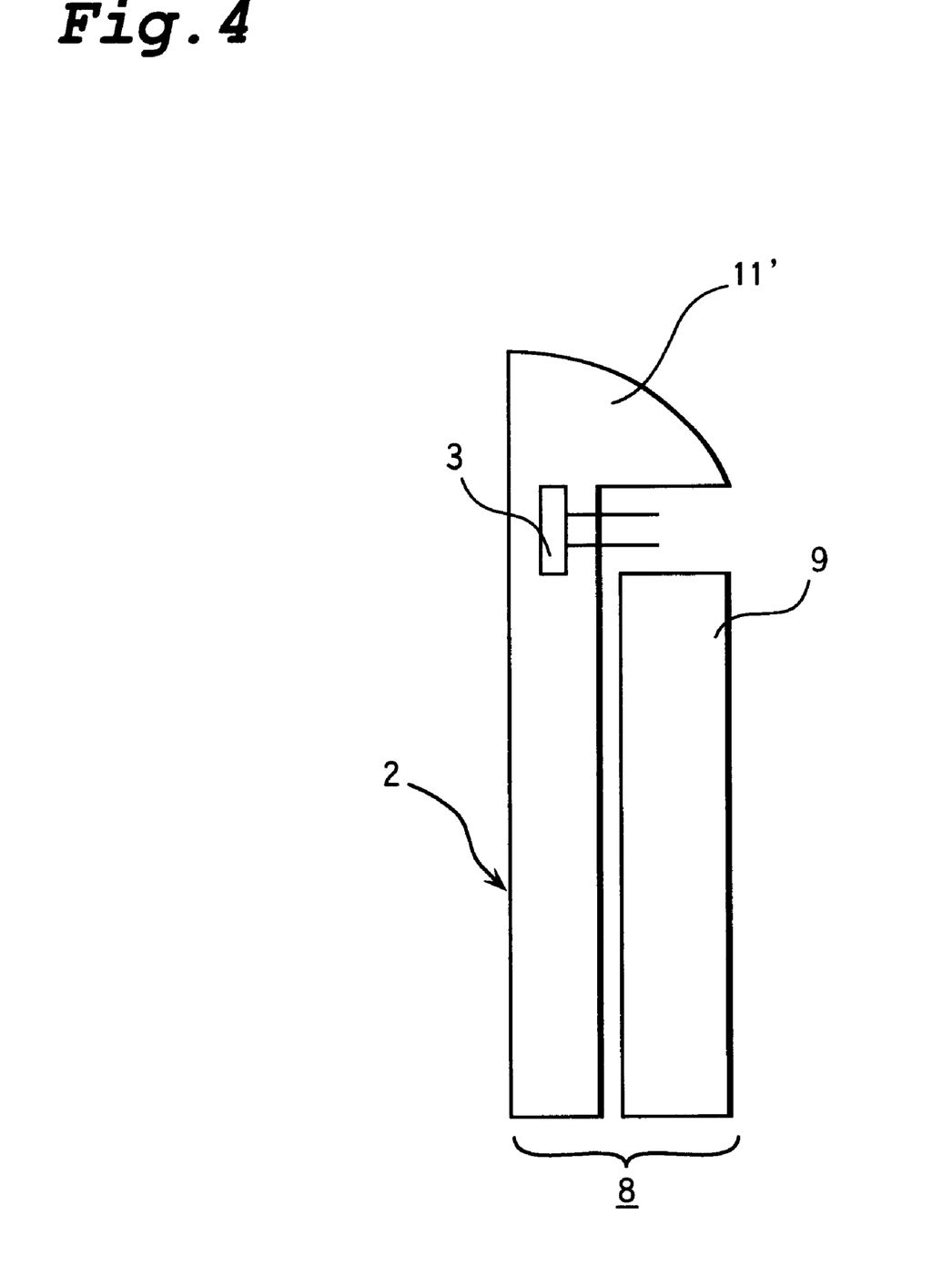
FIG. 4 is a schematic view illustrating a display provided with a surface light source of the present invention.

FIG. 4 is a schematic view illustrating a display provided with a surface light source of another embodiment in the present invention.

An external light collecting portion 11' in a light guide plate 1 of this embodiment is curved, has an umbrella shape, and is projected toward a liquid crystal panel 9 in order to increase a dimension for collecting the incident light. The length of the projected portion of the umbrella is approximately equal to the width of the liquid crystal panel 9, and the liquid crystal panel 9 is disposed elaborately by taking advantage of the shape of the external light collecting portion. An internal light source 3 is mounted to a mounting portion for an internal light source provided with the light guide plate 1 although these compositions are not illustrated in the figure.

The internal light source 3 included in the surface light source 2 is mounted on the upper side of the liquid crystal panel 9 to make the device slimmer than the display in FIG. 3. Although the internal light source 3 is illustrated in emphasized manner in FIG. 4, it is actually very small and does not prevent the external light from coming in from the external light collecting portion 11'.

In the above embodiment, the internal light source 3 is disposed on the light emissive surface side in the light guide plate 1 or the external light collecting portion side from an extension of the surface on which the liquid crystal panel 9 is mounted. However, the internal light source 3 can be disposed on both sides of the light guide plate 1 so as to increase an amount of incident light to be brought to the light guide plate 1.

As described above, regarding the light guide plate, surface light source and display of the present invention, the internal light source 3 is disposed in proximity to the external light collecting portion 11(11') and a light reflection process can be employed to the opposite surface to the external light collecting portion 11(11'). Therefore, the present invention can contribute to reducing electric power consumption by preventing the light collected from the external and internal light collecting portion 11(11') and 16 from being leaked, and improving the efficiency of light utilization.

Furthermore, in the surface light source and display of the present invention, the internal light source is disposed on the light emission side of the light guide plate or on the external light collecting portion side from an extension of the surface on which the non-self light emission type display is mounted. This construction can achieve a slimmer device.

Although the present invention has been described and illustrated in detail, it is clearly understood that the same is and example only and is not to be taken by way of limitation by way of illustration, the spirit and scope of the present invention being limited only by the terms of the appended claims.

What is claimed is:

1. A light guide plate comprising:
   a light guide plate having a light incident surface and a light emissive surface, on faces of said light guide plate, and end surfaces at ends of said light guide plate;
   an external light collecting portion formed on one of said end surfaces of said light guide plate for collecting external light; and
   a mounting portion for an internal light source formed for mounting an internal light source near said one of said end surfaces in proximity to said external light collecting portion in said light guide plate.

2. The light guide plate according to claim 1, wherein an internal light collecting surface is formed on said mounting portion for an internal light source.

3. The light guide plate according to claim 1, wherein said mounting portion for an internal light source is formed in a position where external light emitted from said external light collecting portion in said light guide plate is not obstructed thereby.

4. The light guide plate according to claim 1, wherein said mounting portion for an internal light source is formed on said light emissive surface in said light guide plate.

5. The light guide plate according to claim 1, wherein said mounting portion for an internal light source is formed on an opposite surface to said light emissive surface in said light guide plate and on said external light collecting portion side from an extended line along the most upper surface on which a non-self light emission type display is mounted.

6. A surface light source comprising:
   a light guide plate having a light incident surface and a light emissive surface, on faces of said light guide plate, and end surfaces at ends of said light guide plate;
   a mounting portion for an internal light source formed near said one of said end surfaces in proximity to an external light collecting portion formed on one of said surfaces of said light guide plate; and
   an internal light source provided to said mounting portion for an internal light source.

7. The surface light source according to claim 6, wherein said internal light source is formed in a position where external light emitted from said external light collecting portion in said light guide plate is not obstructed thereby.

8. The surface light source according to claim 6, wherein said internal light source is disposed on said light emissive surface in said light guide plate.

9. The surface light source according to claim 6, wherein said internal light source is disposed on an opposite surface to said light emissive surface of said light guide plate and on said external light collecting portion side from an extended line along the most upper surface on which a non-self light emission type display is mounted.

10. The surface light source according to claim 6, wherein said internal light source is a light emitting diode.

11. The surface light source according to claim 10, wherein said light emitting diode as an internal light source emits white light.

12. The surface light source according to claim 10, wherein said light guide plate is provided with wavelength converting means for converting wavelength of light emitted from said light emitting diode as an internal light source.

13. The surface light source according to claim 12, wherein
said wavelength converting means is fluorescent material put into the inside of said light guide plate.

14. The surface light source according to claim 12, wherein
said wavelength converting means is fluorescent material layer provided on said light emissive surface or the opposite surface to said light guide plate.

15. The surface light source according to claim 6, wherein
light reflection means is provided to the opposite surface to said external light collecting portion in said light guide plate.

16. A display comprising:
a light guide plate having a light incident surface and a light emissive surface, on faces of said light guide plate, and end surfaces at ends of said light guide plate;
an external light collecting portion formed on one of said end surfaces of said light guide plate for collecting external light;
a mounting portion for an internal light source formed in proximity to said external light collecting portion in said light guide plate;
an internal light source provided to said mounting portion for an internal light source; and
a non-self light emission type display mounted in proximity to said light emissive surface of said light guide plate.

17. The display according to claim 16, wherein
said non-self light emission type display is a liquid crystal panel.

* * * * *